UNITED STATES PATENT OFFICE.

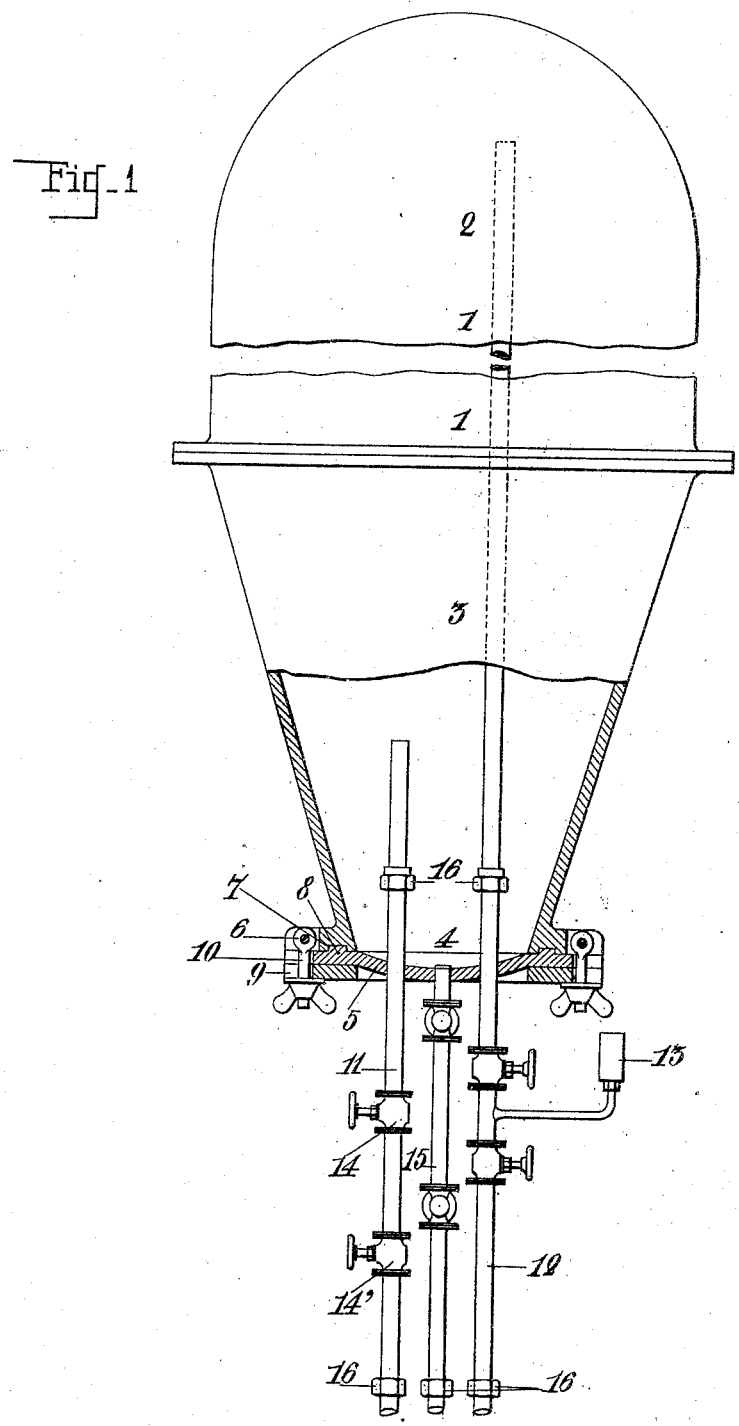

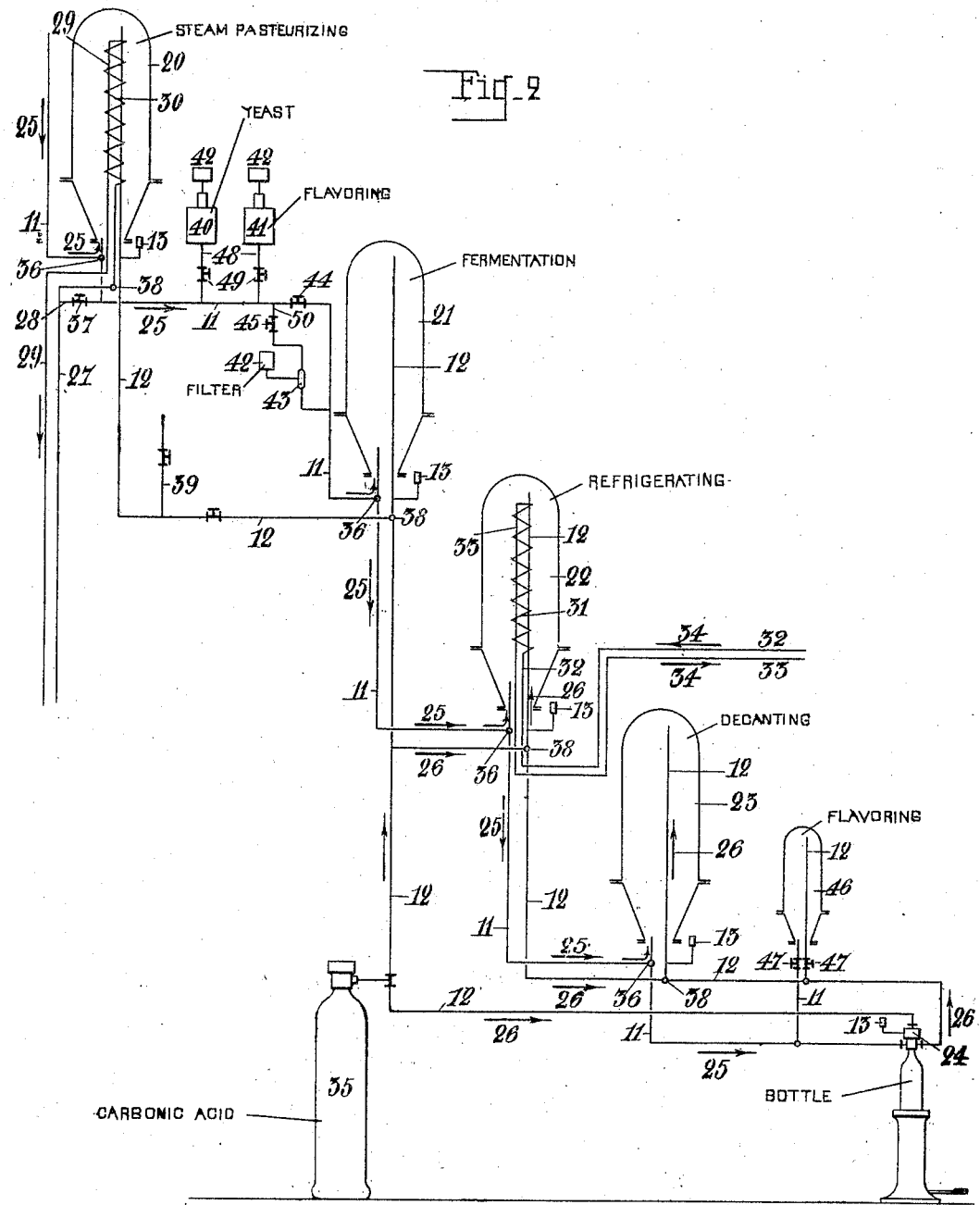

EUGÈNE CHARMAT, OF PARIS, FRANCE.

APPARATUS FOR FERMENTATION AND DECANTATION OF SPARKLING WINES UNDER PRESSURE.

No. 927,944.          Specification of Letters Patent.          Patented July 13, 1909.

Application filed January 27, 1909. Serial No. 474,483.

*To all whom it may concern:*

Be it known that I, EUGÈNE CHARMAT, a citizen of the French Republic, residing at Paris, 18 Rue de Magador, in the Department of the Seine, France, have invented a new and useful Improvement in Apparatus for the Fermentation and Decantation of Sparkling Wines under Pressure, of which the following is a specification, and for which a French patent has been filed February 1, 1908.

This invention has for its object an apparatus for effecting the secondary fermentation and the decantation of sparkling wines in a closed cycle and under constant pressure, the decantation being effected solely by means of the difference of level between the respective containers and without there being the least reduction of pressure above the liquid which is being decanted. The apparatus has been planned so as both to avoid any possibility of escapes of gas bringing about an increase of pressure in the receptacle containing the wine to be withdrawn, and further to enable all the constituent parts of the mechanism to be easily cleaned.

In the drawings accompanying this specification: Figure 1 is an elevation shown partly broken off, of that portion of the apparatus in which the second fermentation of the wine is conducted. Fig. 2 shows a diagrammatic plan of the totality of the apparatus in which the entire series of operations is conducted.

In these drawings, like reference figures indicate like parts throughout.

The receptacle for the second fermentation illustrated in Fig. 1 of the accompanying drawing, comprises a large cylindrical receptacle 1 formed of steel plate joined with autogenous soldering, and lined internally with a glass lining which is extremely adherent and unattackable, the vessel being of a variable capacity preferably adapted to contain several hectoliters. Its upper portion terminates in a hemisphere 2, and its lower portion 3 is of truncated cone shape and terminates in an aperture 4, which aperture can be closed by a cover 5 of silvered ferro-nickel, making a perfectly tight joint. The joint is made by means of a ring or clamp 6 formed in the substance of the metal of the receptacle and having on its flat face a circular groove 7 in which there is located a corresponding tongue 8 in one piece with the lid 5. A ring 9 clamped by means of bolts 10, keeps the lid 5 pressed firmly upon the part 6. The bolts 10 are connected by means of suitable eyelets with the part 6 and fit in cavities in the lid 5 and in the ring 9. Upon this lid 5 are further secured the various pipes which serve, by means of suitable connections 16, to put the interior of the receptacle into communication both with the wine which is to undergo the second fermentation (connection 11), and with the carbonic acid or other inert gas under pressure (connection 12, which has a manometer 13 showing the pressure). Suitable cocks or valves are arranged so as to permit of closing or opening these connections at will. In the case of the wine under consideration, a double cock 14, 14' admits of taking a sample whenever this is desirable, without reducing the pressure of the carbonic acid or other inert gas in the apparatus. A third connection 15 effects the discharge when this is requisite.

It should firstly be remarked that the vessel which is used for the pasteurization of the wine is arranged in the same manner, but with this sole difference, namely, that the lid supports three further connections which serve, the first for the supply of steam to the pasteurization coil, the second for the discharge of this steam, the third for the insertion of a thermometer for the purpose of taking the temperature of the liquid contained in the receptacle.

The totality of the apparatus which serves both for the industrial manufacture of sparkling wine and of fermented liquids in general, and for the decantation of these wines and liquids in a closed cycle and under constant pressure, is shown by way of example and diagrammatically in Fig. 2 of the accompanying drawing. In this diagram 20 indicates the pasteurizing vessel, 21 is one of the elements forming the fermentation vessels, the number of which varies according to the scale of the manufacture, 22 is the decantation receptacle, 23 the container of the decanted liquid, and 24 the discharge vessel with counter-pressure. The figure 11 indicates the pipe from which the wine circulates in the direction of the arrows 25. The figure 12 indicates the pipe in which the carbonic acid or other inert gas under pressure circulates, in the direction of the arrows 26. The figure 27 indicates a pipe for the circulation of steam, which pipe, by means of the branch 28 and the cock 37, can be put into communication with pipes 11 in which the wine circulates for the purpose of cleaning. 29 indicates the return pipe for the condensed steam; 30 indicates the steam coil for the pasteurization, 31 the refrigeration coil. This latter is in connection both with pipes 32 and 33, which effect the circulation of the refrigerating medium in the direction of the arrows 34. 35 is a receptacle for carbonic acid or other inert gas; 36 indicates three-way cocks for the purpose of directing the wine in the one or the other direction with relation to the receptacles 20, 21, 22, 23.

In order that the fermentation may take place under the best conditions, it is necessary that the wine after pasteurizing may be mixed with the flavoring liquid and with the ferment on the one hand, and with air on the other hand. Consequently in view of the great capacity of the fermentation vessels, it is indispensable that these elements shall be intimately intermingled with the wine and distributed in such a manner that every part of the liquid shall be perfectly homogeneous. For this purpose there is placed upon the pipe 11, which connects the pasteurizer 20 to the fermentation vessel 21:

(a) A pipe 48 provided with a cock with indicator 49 for the purpose of supplying from the vessel 40 containing it and for regulating the said supply, the ferment necessary for the fermentation. 42 indicates a filter which causes the receptacle 40 to communicate with the atmosphere.

(b) A pipe of the same kind which serves to supply from a vessel 41 the sweetened flavoring liquid.

(c) A branch pipe 50 which enables me to turn the wine at will by means of the cocks 44 and 45 into a vessel 43 where it aspirates through the filter 42 the air necessary for the fermentation.

By adjusting the cocks 44 and 45, the wine can be caused to pass as may be requisite, into the parts 50 and 43 whereby it is caused to carry with it previously filtered air necessary for the fermentation. Further, in order to deliver suitably the dosing or finishing liquid into the bottles, there are connected upon the pipes 11 and 12 which unite the drawing vessel to the isobarometric withdrawing apparatus, the two corresponding pipes which come from a receptacle 46 similar to the receptacles above described, but of smaller capacity, into which is placed the flavoring liquor.

The cocks 47 are arranged so as to connect or otherwise at will the receptacle 46 into the cycle, in such a manner that the dosing liquor is mingled in the desired quantity with the wine passing through the pipe 11 to the isobarometric withdrawing apparatus.

The apparatus operates in the following manner: The wine coming from the upper portion of the apparatus through the pipe 11 shown by the arrow 23, first passes into the pasteurization receptacle 20, the cock 36 being suitably adjusted, and is submitted in this receptacle to the heat of the steam which traverses the coil 30. The temperature of the pasteurization is 62° C. The pasteurizing operation being completed, the wine is then discharged into the receptacles 21 by another adjustment of the cocks 36, and while permitting a passage of air previously filtered, which may for example pass through the part 39. The fermentation is then effected, and from the receptacles 21 by a further adjustment of the cocks 36 and undergoing a first decantation, the wine passes into the receptacle 22, in which after it has been clarified by cooling, the decantation is completed; from this receptacle the wine passes finally into the drawing off receptacle 23. During the transmission, the wine encounters in the receptacles 21, 22 and 23 carbonic acid or some other inert gas having a pressure identical with the pressure which it had on the completion of the fermentation, which carbonic acid or the like it drives from one container into another because it is saturated with it. Finally, the wine flows into the drawing off mechanism 24, which is constructed in the following manner. The bottle being full of air, there is caused to pass into it by means of a suitable cock, carbonic acid which drives out the air and which is allowed to escape by a simple movement of the pedal of the bottling apparatus up to the point at which the pressure in the bottle is the same as that of the wine to be filled into bottles. During this operation of filling into bottles, the carbonic acid escapes by displacement in the direction of the arrow 26'.

What I claim is:

1. In combination with apparatus for bottling effervescent liquids, an apparatus adapted to maintain uniform gaseous pressure, comprising fermentation receptacles, pasteurizing apparatus, cooling and decanting apparatus, a source of carbonic acid or other inert gas, an air-inlet filter, a storage receptacle, all regulatably interconnected.

2. In combination with apparatus for bottling effervescent liquids, an apparatus comprising a steel plate cylinder having a vitreous lining adapted to contain gases, inlet and outlet pipes connected to the lower part of said cylinder, a pasteurizing device, a cooling and decanting device, a source of carbonic acid or other inert gas, an air-inlet filter, a storage receptacle, all regularly interconnected.

3. In combination with apparatus for bottling effervescent liquids without reduction of pressure, fermentation receptacles, a pasteurizing apparatus, cooling and decanting apparatus, a source of carbonic acid or other inert gas, a dosing apparatus, a storage receptacle, and a system of pipes arranged and combined to serve for the circulation of the wine through the apparatus and the interconnection of the parts under gas pressure for the purpose of maintaining the same uniform throughout the apparatus, a system of pipes for the circulation of steam for pasteurizing and for cleansing the interior of the vessels and pipes and a system of pipes for the circulation of a refrigerating medium through the cooling and decanting apparatus, and an air inlet filter, the whole so combined that the fermentation receptacles are in communication with the outer atmosphere through said filter, while the remainder of the apparatus is in a closed cycle adapted to maintain the effervescent liquid under uniform gas pressure throughout.

In testimony whereof I have signed my name to this specification in the presence of two subscribing witnesses.

EUGÈNE CHARMAT.

Witnesses:
  JULES FAYVERT,
  EUGÈNE PICHON.